United States Patent [19]

Bowers et al.

[11] Patent Number: 4,704,716

[45] Date of Patent: Nov. 3, 1987

[54] METHOD AND APPARATUS FOR ESTABLISHING A WIDEBAND COMMUNICATION FACILITY THROUGH A COMMUNICATION NETWORK HAVING NARROW BANDWIDTH CHANNELS

[75] Inventors: Thomas E. Bowers, Warrenville; Alan E. Frey, Naperville; Howard A. Kerr, West Chicago, all of Ill.; Larry A. Russell, Aberdeen, N.J.; Roger E. Stone, Naperville, Ill.

[73] Assignee: American Telephone and Telegraph Company, AT&T Bell Laboratories, Murray Hill, N.J.

[21] Appl. No.: 815,400

[22] Filed: Dec. 31, 1985

[51] Int. Cl.[4] .............................. H04J 3/16; H04J 3/22
[52] U.S. Cl. ........................................ 370/58; 370/63; 370/84; 370/95
[58] Field of Search ..................... 370/112, 89, 95, 58, 370/84, 63, 110–111, 118

[56] References Cited

U.S. PATENT DOCUMENTS

| | | | |
|---|---|---|---|
| 4,393,497 | 7/1983 | Cantwell, Jr. | 370/89 |
| 4,520,479 | 5/1985 | Grima | 370/84 |
| 4,524,440 | 6/1985 | Orsic | 370/54 |
| 4,549,292 | 10/1985 | Isaman et al. | 370/89 |
| 4,577,312 | 3/1986 | Nasit | 370/84 |
| 4,628,502 | 12/1986 | Boulard et al. | 370/63 |

OTHER PUBLICATIONS

R. P. Abbot et al., "Digital Access and Cross–Connect System—System Architecture", *National Telecommunications Conference*, vol. 1, Nov. 29–Dec. 3, 1981, pp. B1.2.1–B1.2.7.

S. Andresen, "A Novel STS Structure", *Colloque International De Communication*, Paris, May 1979, pp. 405–412.

Primary Examiner—Douglas W. Olms
Assistant Examiner—Curtis Kuntz
Attorney, Agent, or Firm—Richard J. Godlewski

[57] ABSTRACT

A wideband communication facility is established via a switched network between calling and called terminals. The wideband facility comprises a number of segments, each segment including a plurality of narrowband time division multiplex channels having a total bandwidth at least equal to the bandwidth of the wideband facility. A switching system of the network interconnects the wideband facility segments and assembles all the data received in a given time frame from one segment into the single time frame for transmission to another facility segment. Additional buffer memories are added to the initial and final stages of a time-space-time switching network to insure that all the data received in one time frame from a given facility segment is assembled only into the same time farme for transmission on an outgoing facility segment.

20 Claims, 12 Drawing Figures

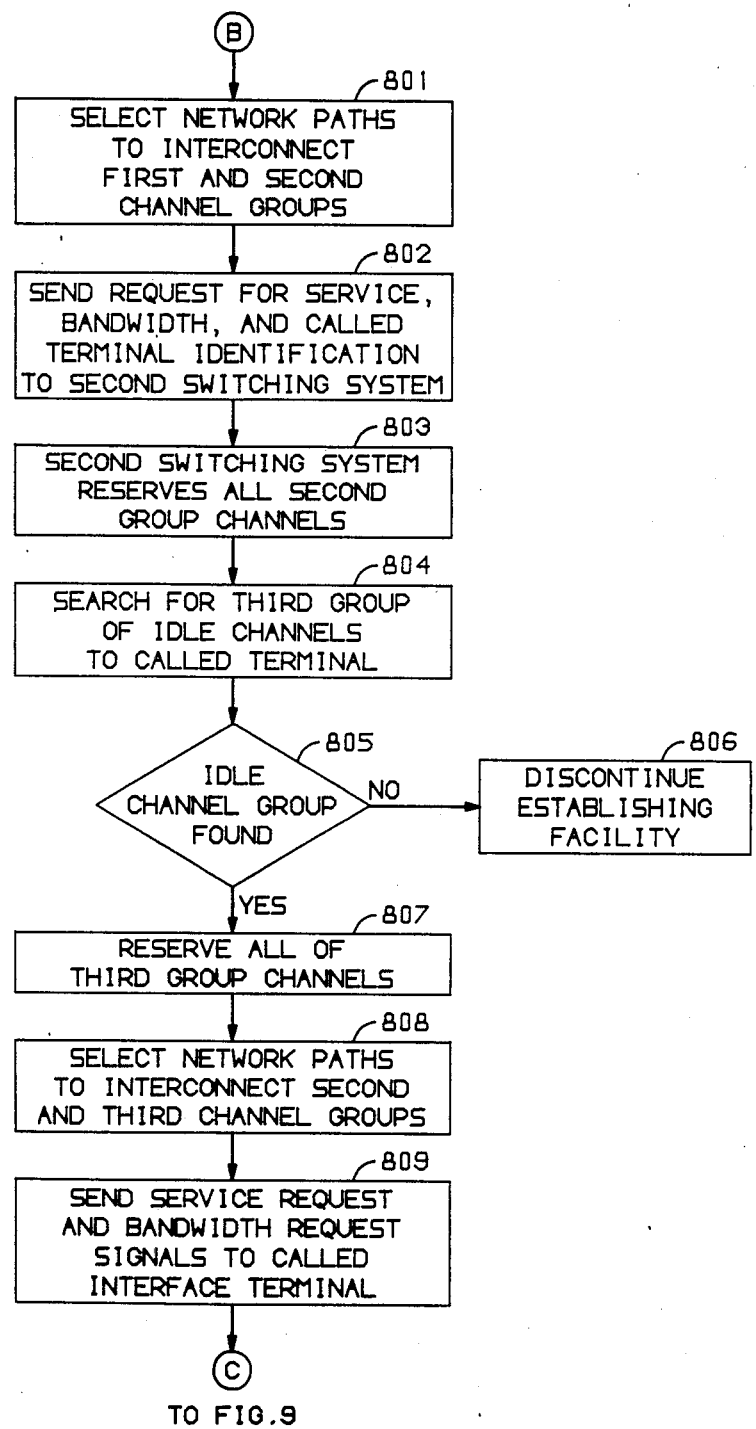

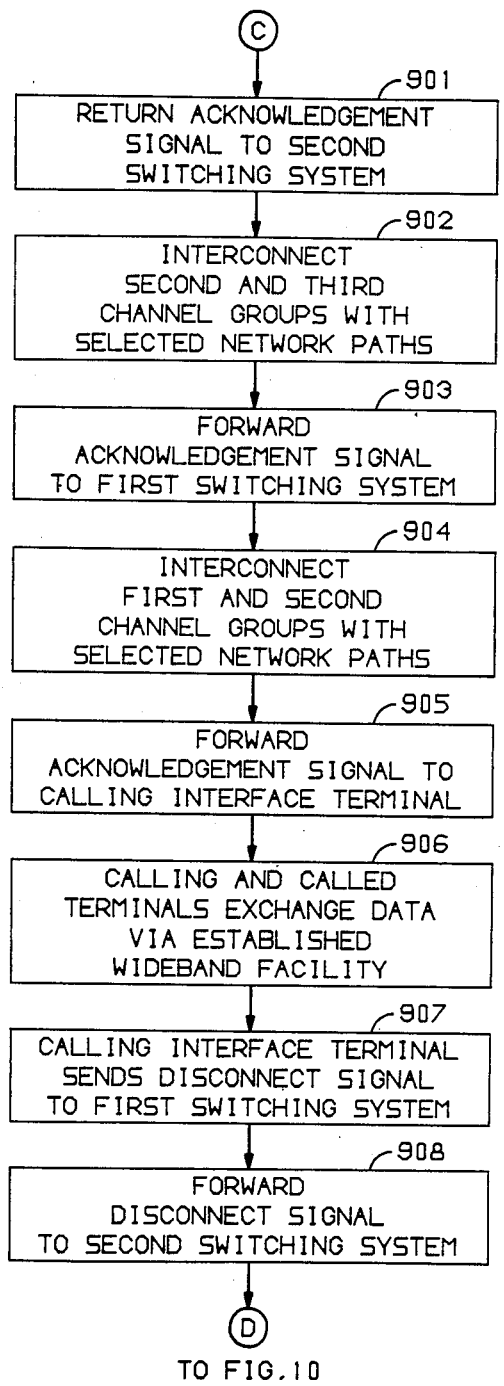

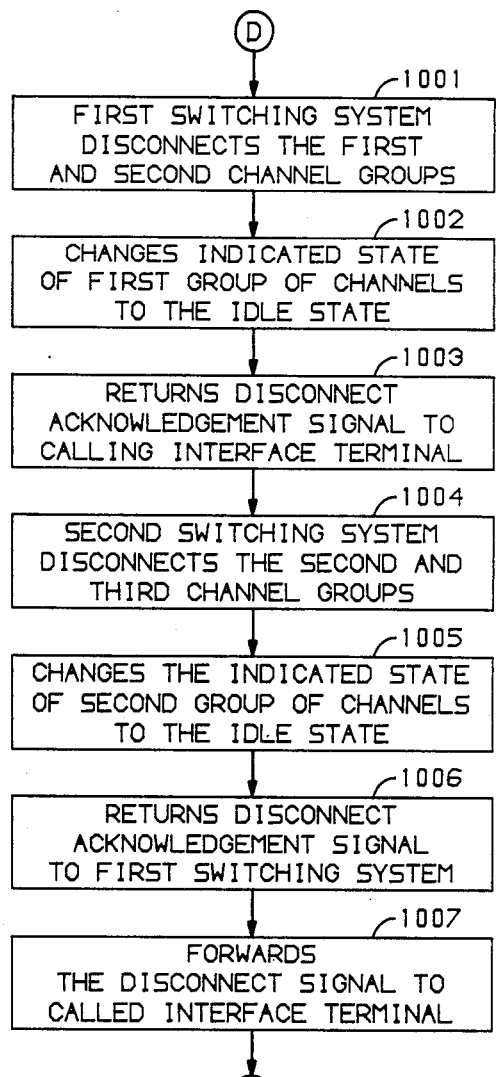

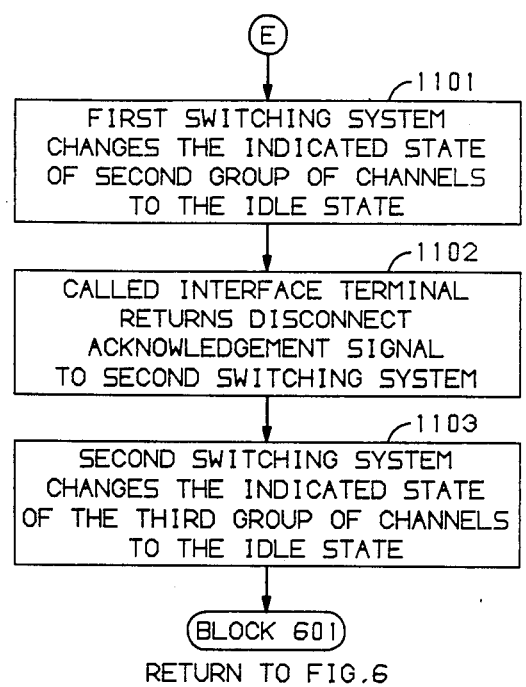

METHOD AND APPARATUS FOR ESTABLISHING A WIDEBAND COMMUNICATION FACILITY THROUGH A COMMUNICATION NETWORK HAVING NARROW BANDWIDTH CHANNELS

TECHNICAL FIELD

This invention relates to communication networks and particularly to a method and apparatus for establishing a wideband communication facility between customer terminals via a switched network. The invention further relates to apparatus for establishing a wideband communication facility utilizing a plurality of narrowband communication channels. The invention specifically pertains to apparatus for establishing the wideband communication facility without introducing time frame delay variations between the channels in which memory and control arrangements are provided for ensuring that a plurality of digital signals received synchronously or asynchronously are switched through a switching system in the same time frame and not disbursed throughout a plurality of time frames.

BACKGROUND OF THE INVENTION

With the advent of the information age, there is an increasing need to transmit large quantities of information among a multitude of customer terminals. The information, in the form of digital signals, customarily represents voice communication, video, facsimile, and/or bulk data transfers.

While the existing public-switched telecommunication networks can offer access to a number of the customer terminals requiring wideband service, most digital communication within the switched network is limited to 64 Kilobits per second (Kbps) due to the constraints imposed by existing switching and transmission facilities.

In those specific applications requiring greater bandwidth, private line facilities can be provided between selected customer terminals. Such private line wideband facilities, however, are costly, and since they only serve a few terminals, they are frequently idle and not fully utilized.

Combining several narrowband channels to form a wideband facility between customer terminals via the public-switched telecommunications network has been suggested in the prior art. However, correcting any time frame misalignment that may occur between the combined channels required the initial use of a test signal to detect time frame misalignment and a data recovery unit to compute any time frame misalignment and to introduce delay in selected ones of the narrowband channels to recorrelate the data into its original pattern. In addition to introducing costly equipment to the network, the prior art did not address the problem of how to correct for any time frame misalignment that may occur after an initial correction is made. Furthermore, significantly the art does not solve the problem of how to correct for time slot data delay from one time frame to another on the same channel. As a result, data is not received in the same order as it was transmitted.

SUMMARY OF THE INVENTION

The foregoing problems are solved and a technical advance is achieved by a novel method and apparatus for establishing a wideband communication facility through an illustrative switched telecommunications network having narrowband channels without any of the time slot data in one time frame being delayed to another time frame.

In the illustrative embodiment of the invention, a wideband facility is established between a calling and a called terminal through a switching system by establishing one segment of the facility between the calling terminal and a switching system and another segment between the switching system and the called terminal. Each segment is comprised of a group of a narrowband time multiplexed channels having a total bandwidth at least equal to the desired wideband facility. The switching system interconnects the two facility segments and advantageously assembles all the data received in a given time frame from the first segment only into the same time frame for transmission on the second segment.

This method and apparatus is extendable to establish a wideband facility via any number of network switching systems.

Illustratively, a segment of the wideband facility is established between each interconnecting switch serving the calling and called customer terminals. Each switch interconnecting two facility segments advantageously assembles all the data received in a given time frame from the incoming segment only into the same time frame for transmission on the outgoing segment.

A calling customer terminal is enabled to specify the desired bandwidth of the wideband facility to meet the demands of that customer. Thus, any number of time division multiplex (TDM) channels are combinable to establish a desired wideband facility through a switched-telecommunications network.

The bandwidth and destination of any wideband facility is controlled in response to a facility bandwidth request signal and a called customer identification signal sent from, for example, the calling customer terminal.

Buffer memory and control arrangements are incorporated in initial and final switching stages of a specific time-space-time switching system network advantageously to correct time slot data delay variations from one time frame to another. This is accomplished by the switching network interconnecting the compositional wideband channels to transmit only narrow-band channel data in the same time frame as received. In an illustrative initial time slot interchanger where read and write cycles coincide, two such buffer memories are alternatively written into and read out of to prevent any time slot data time frame variations and to keep all the data received in a time frame in the same outgoing time frame. In an outgoing time slot interchanger where read and write cycles do not coincide due to switching network signal propagation delays, three buffer memories are successively written into and read out of to keep all the data received in a given time frame from the initial time slot interchanger for transmission in the same time frame to the outgong facility segment.

BRIEF DESCRIPTION OF THE DRAWING

The invention is more fully understood from the following detailed description when read with reference to the drawing in which:

FIGS. 6 through 11 depict an illustrative flow diagram of a method for establishing a wideband communication facility through a communication network having narrow bandwidth channels; and FIG. 12 shows the interrelationship of FIGS. 1 and 2 to form a single illustrative communications network.

DETAILED DESCRIPTION

Figure 1:
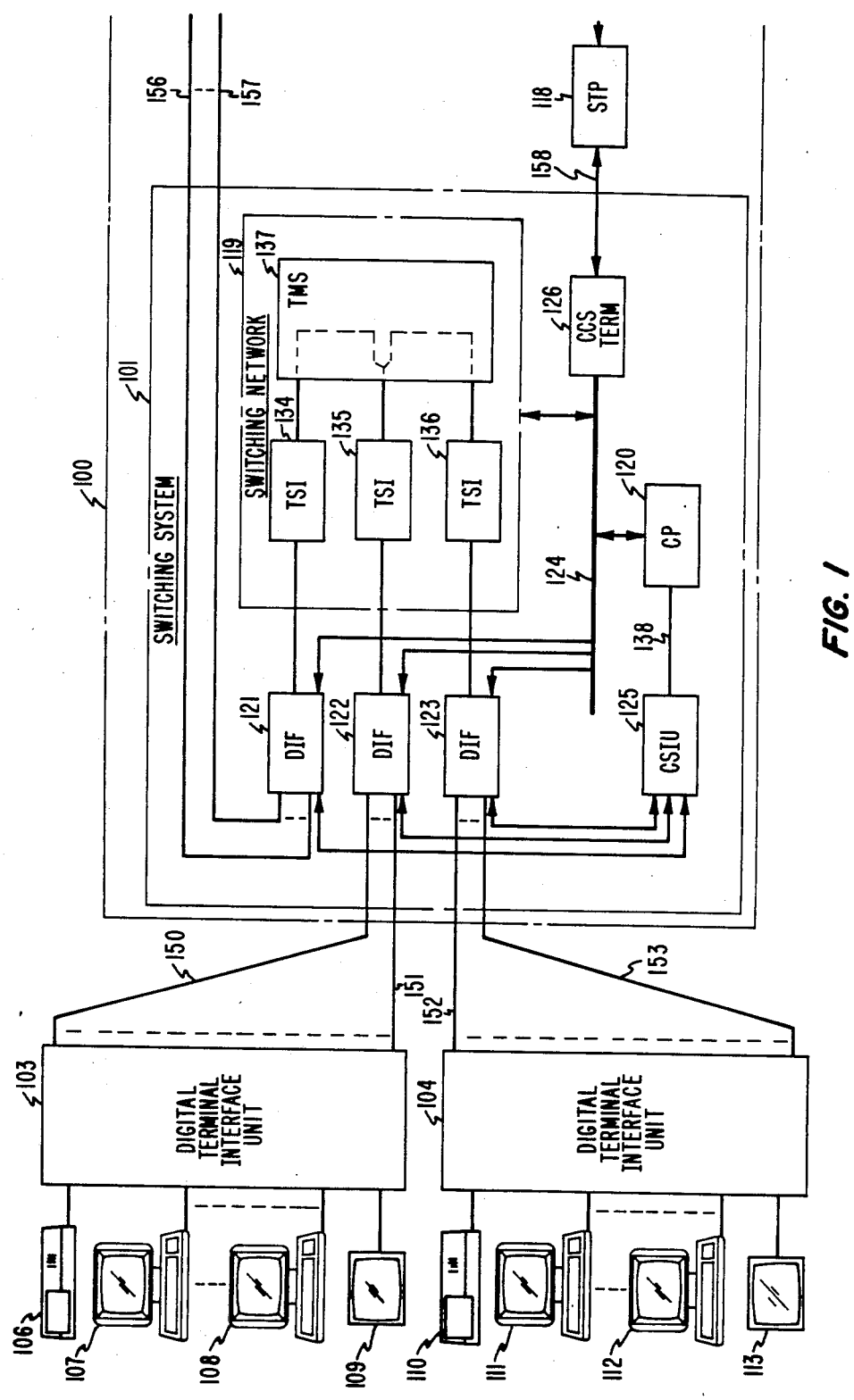
FIGS. 1 and 2 depict an illustrative communications network.
Figure 2:
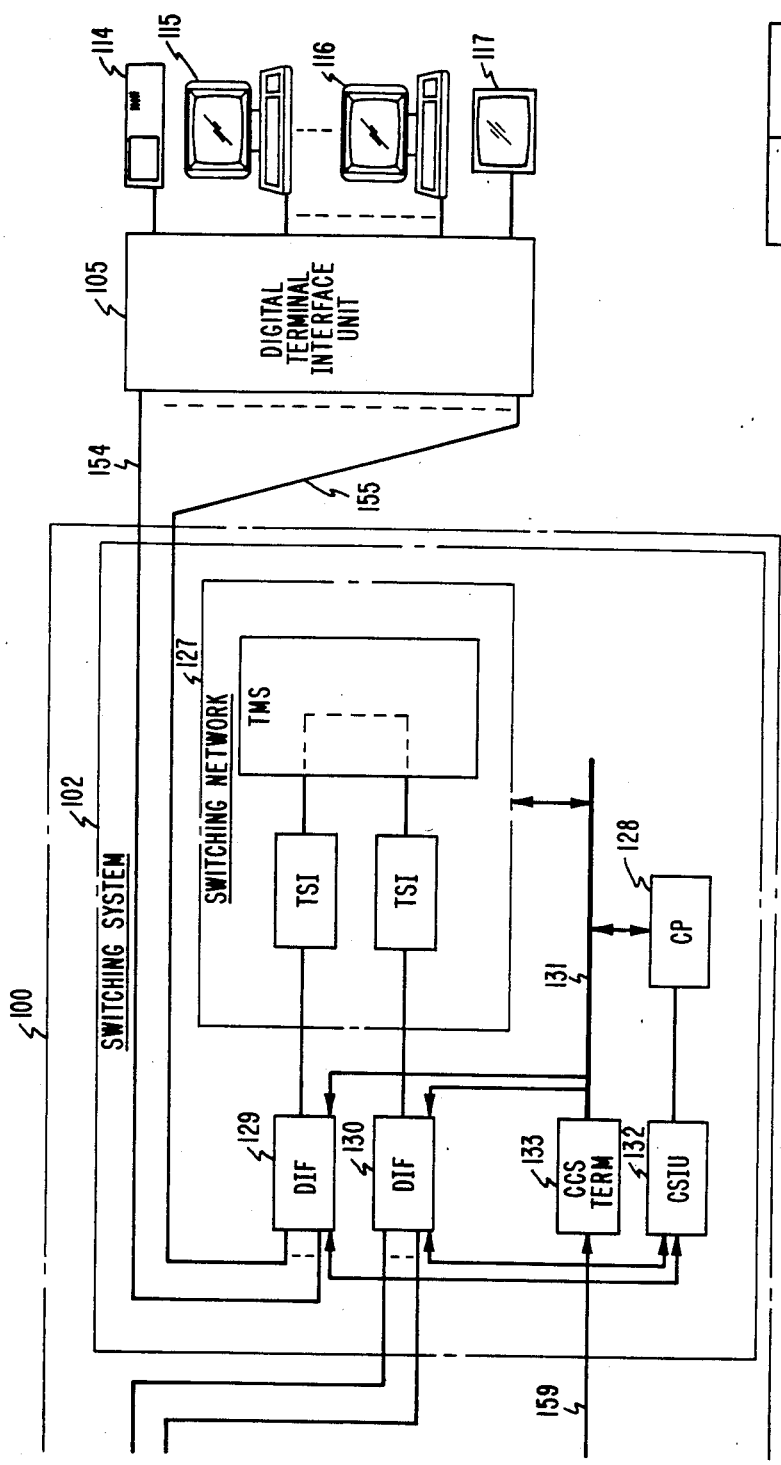
Figure 3:
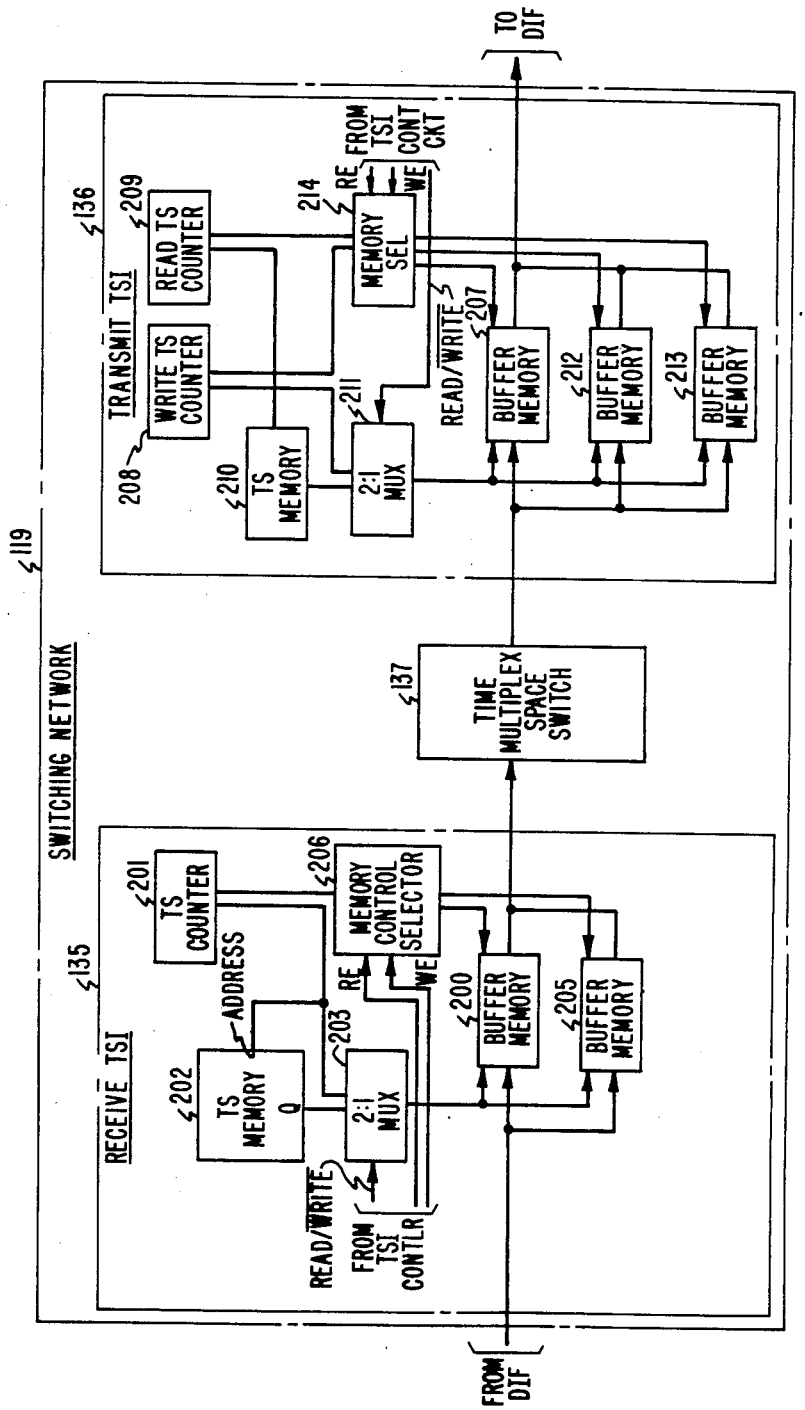
FIG. 3 depicts a block diagram of the switching network utilized in the switching system of FIG. 1.

Depicted in FIGS. 1 and 2 is an illustrative telecommunications network 100 including switching systems 101 and 102. This network includes illustrative apparatus and utilizes an illustrative method for establishing a wideband communication facility between a calling customer interface terminal such as 103 and a called customer interface terminal such as 104 via a switching system such as 101. Customer interface terminal 103 serves a plurality of customer terminal equipment 106–109, and customer interface terminal 104 serves a plurality of customer terminal equipment 110–113. In addition, a wideband communication facility may be, for example, established between a calling customer interface terminal 103 and a called customer interface terminal 105 via a plurality of switching systems such as 101 and 102. Customer interface terminal 105 serves a plurality of customer terminal equipment 114–117. The telecommunications network and customer interface terminals are interconnected by a plurality of digital lines 150–157 such as the well-known T-1 digital carrier line that serially transmits 64 Kilobits per second (Kbps) of data via 24 time division multiplex (TDM) channels having well-known clear channel capability. As shown, a first plurality of digital lines such as 150 and 151 interconnect switching system 101 and customer interface terminal 103. A second plurality of digital lines such as 152 and 153 interconnects switching system 101 and customer interface terminal 104. A third plurality of digital lines such as 154 and 155 interconnects switching system 102 and customer interface terminal 105. Similarly, a fourth plurality of digital lines such as 156 and 157 interconnect switching systems 101 and 102. Each TDM channel has a relatively narrow bandwidth for exchanging data at a maximum rate of, for example, 64 Kbps.

In response to a service request signal sent by a calling customer interface terminal, a wideband communication facility having a customer-selected bandwidth wider than any of the TDM channels may be established between calling and called customer interface terminals to transmit data at a much higher rate of, for example, 384 Kbps or 1536 Kbps. The customer-selected bandwidth of the wideband facility is indicated by a facility bandwidth request signal sent by the customer interface terminal to the serving switching system. For example, this is accomplished by establishing a first segment of the wideband communication facility between calling customer interface terminal 103 and switching system 101 in response to a service request sent by the calling customer interface terminal via an out-of-band signaling channel. This first segment comprises a first group of the TDM channels between switching system 101 and customer interface terminal 103 having a total bandwidth at least equal to the customer-selected bandwidth of 384 or 1536 Kbps as indicated by a facility bandwidth request signal. When a 384 Kbps bandwidth request signal is sent by the calling customer interface terminal, six 64 Kbps channels between the switching system and customer interface terminal are selected to form the first segment of the wideband facility. Alternatively, when a 1536 Kbps bandwidth request signal is sent by the calling customer interface terminal, 24–64 Kbps channels between switching system 101 and customer interface terminal 103 are selected to form the first segment.

A second segment of the wideband facility is established between switching system 101 and called customer interface terminal 104 in response to a called terminal identification signal sent by the calling interface terminal with the service request signal. This second segment comprises a second group of TDM channels between switching system 101 and called interface terminal 104 having a total bandwidth at least equal to the bandwidth indicated by the calling interface terminal. With the two segments of the wideband facility established, the switching system interconnects the two segments with a plurality of switching system network paths having a bandwidth at least equal to the customer-selected bandwidth and assembles all the data received in a given time frame from the first channel group established in the first facility segment only into the same time frame for transmission on the second channel group in the second facility segment to the called interface terminal.

Telecommunications network 100 comprises a plurality of switching systems such as 101 and 102. Switching system 101 serves a plurality of customer terminal equipment such as computer 106, data terminals 107 and 108, video equipment 109 via customer interface terminal 103. Similarly, switching system 101 also serves computer 110, data terminals 111 and 112, and video equipment 113 via customer interface terminal 104. Switching system 102 serves a plurality of customer terminal equipment such as computer 114, data terminals 115 and 116, and video equipment 113 via customer interface terminal 105. The customer interface terminal equipment digitally multiplexes the data from a plurality of customer terminal equipment such as data terminals 107 and 108 and transmits the multiplexed data to a called interface terminal via a wideband communication facility. The called interface terminal demultiplexes the multiplexed data and sends the demultiplexed data to the indicated called terminal equipment such as data terminals 115 and 116. High bit rate customer terminal equipment such as computers 106 and 114 may also be interconnected by a wideband communication facility established between customer interface terminals 103 and 105. A plurality of digital lines such as 156 and 157 interconnects the switching offices of the communication network. Thus, a wideband communication facility may be established between wideband terminal equipment by selectively grouping and interconnecting narrowband TDM channels via the switching systems and customer interface terminals.

Control signaling between switching systems 101 and 102 is facilitated by a well-known common channel signaling (CCS) system transferring information between switching systems 101 and 102. For example, this CCS system includes well-known signal transfer point 118 and data links 158 and 159 for transferring information separate from the TDM channels. The CCS system transfers messages indicative of well-known billing, control, routing and supervisory information. The CCS messages are also used to transfer requests for service, the customer-selected bandwidth of the communication facility, and called terminal identification. A typical CCS system is described in *The Bell System Technical Journal,* vol. 57, No. 2, February, 1978, and in U.S. Pat. No. 3,624,613 of W. B. Smith et al., issued Nov. 30, 1971. Substitution of the 2STP system commercially available from AT&T for the 1STP system described in the cited CCS system reference is recommended for high volume message applications.

Switching systems 101 and 102 are typical stored program-controlled systems such as the 4ESS TM digital switch which is manufactured by AT&T Technologies, Inc. This switching system is described in *The Bell System Technical Journal,* Vol. 56, No. 7, September, 1977, and Vol. 60, No. 6, Part 2, July-August, 1981, and need not be fully described herein for the reader to understand the present invention. Basically, switching system 101 comprises switching network 119, central processor (CP) 120, and digital interface frames (DIF) 121-123 interconnected by peripheral unit bus 124. Also connected to central processor 120 is customer out-of-band signaling interface unit (CSIU) 125 and CCS terminal 126. Miscellaneous equipment units have not been shown to simplify the drawing. System 102 similarly comprises switching network 127, central processor 128, and digital interface frames 129 and 130 interconnected by peripheral unit bus 131. Also connected to central processor 128 are customer out-of-band signaling interface unit 132 and CCS terminal 133.

Switching network 119 has a time-space-time switching configuration that utilizes time slot interchanger (TSI) 134-136 and time multiplexed switch (TMS) 137. Access to switching network 119 is via digital interface frames 121-123 which perform time division multiplexing and demultiplexing between switching network 119 and digital lines 150-153, 156, and 157. Furthermore, the digital interface frames buffer and synchronize the data between the digital lines and time slot interchangers. Digital interface frames 121-123 also process peripheral control signals from central processor 120 via peripheral unit bus 124.

Time slot interchangers 134-136 provide the initial time-space and final space-time stages of switching network 119. The interchangers receive incoming pulse coded modulated (PCM) samples over digital facilities in well-known DS-120 format where 120, eight-bit PCM channels are time division multiplexed with eight maintenance channels to form a 128 time slot frame. The receiving portion of a TSI buffers the incoming lines to allow synchronization of the data with switching network timing and performs the initial time-space switching before transmitting the data to the TMS. After passing through the TMS, the data is returned to the same TSI or another TSI where the final space-time conversion is performed. The TSI then reloads the data onto outgoing DS-120 lines which is transmitted to the appropriate digital interface frame and digital line.

Time multiplex switch 137 is a two-switch array comprised of solid state cross points which provide a multiplicity of unidirectional paths between its inputs and outputs. Each network connection through TMS 137 is made in terms of a pair of unidirectional paths in one of the 128 time slots sharing the paths on a repeating basis at an 8 Kilohertz (Khz) rate. This 8 Khz rate corresponds to a 125 usec time frame period. The switches are controlled by information contained in time slot memories, and this information is placed in the memory by the central processor under the control of call processing programs.

The majority of the logic, control, storage and translations functions required for the operation of the switching system are performed by central processor 120. A typical central processor suitable for use in illustrative switching system 101 is described in *The Bell System Technical Journal,* Vol. 56, No. 2, February, 1977.

Control signaling between the switching systems is facilitated by well-known CCS terminal 125 that is connected to central processor 120 via peripheral unit bus 124. Customer out-of-band signaling between central processor 120 and customer interface terminal is facilitated by customer out-of-band signaling interface unit 125 connected to central processor 120 via auxiliary unit bus 138. Each plurality of TDM channels on digital lines 150 and 151 includes at least one channel devoted to customer out-of-band signaling. When only one T-1 digital line is utilized between a customer interface terminal and a switching system, one of the 24 TDM channels is utilized for customer out-of-band signaling. When more than one T-1 digital line is utilized, one out of every 48 TDM channels is utilized for customer out-of-band signaling. This is commonly referred to as 23 B+D or 47 B+D signaling as described in AT&T Communications PUB 41459, "Integrated Services Digital Network (ISDN) Primary Rate Interface", June, 1985, and AT&T Communications PUB 41460 "Special Access Data Channel Interface", October, 1984. With the customer out-of-band signaling arrangement, groups of six or 24 TDM channels may be formed to establish a 384 or 1536 Kbps wideband facility segment. The switching network separates the individual TDM channels and connects the customer out-of-band signaling (D) channel through the network to customer out-of-band signaling interface signaling unit 125 via the digital interface frame and switching network as shown. The customer interface terminals and customer out-of-band signaling interface unit 125 utilize a multilayered signaling protocol such as the Q.931 protocol described in the aforementioned PUB references.

Customer interface terminals 103-105 are digital multiplexers for multiplexing and demultiplexing data transferred between the T-1 digital lines and the customer terminal equipment. The customer interface terminal also interfaces the customer out-of-band control signaling between the customer terminal equipment and the out-of-band signaling D channel. For example, a customer interface terminal may be a commercially available digital private branch exchange.

One of the problems associated with grouping a number of TDM channels to establish a wideband communication facility is transferring the data in one time slot to another in the same time frame. For example, when the data in time slot 2 from a first group of TDM channels in a given time frame is to be written into time slot 17 of the same time frame, the data can be easily written into a buffer memory, read out of time slot 2, and written into time slot 17 of the same time frame. However, when the data, for example, from time slot 23 is to be read into time slot 7 of the same time frame, the data in time slot 23 cannot be buffered, read out of time slot 23, and written into time slot 7 of the same time frame along with the other data from the same group of TDM channels in the same time frame. Accordingly, the data in various time slots from a first group of TDM channels in a given time frame would be written into the time slots of another time frame, thus interchanging the order of the data associated with a given wideband communication facility. In addition, the read and write cycles of the final time slot interchanger overlap. This also causes time slot data to be delayed from one time frame to another. To solve this delay problem and keep all the data received in a given time frame in the same outgoing time frame, several buffer memories and memory control selectors were added to the receive and transmit time slot interchangers in switching networks 119 and 127.

Figure 4:
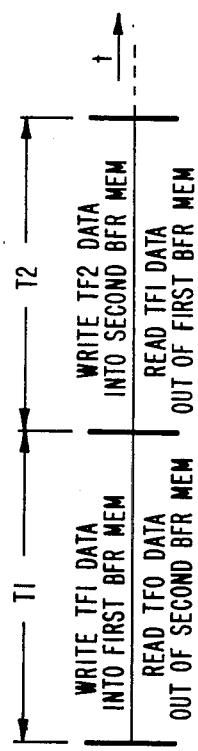
FIGS. 4 and 5 depict an illustrative timing diagrams associated with the initial and final time slot interchange stages of the switching network of FIG. 3.

Depicted in FIG. 2 is a detailed block diagram of receive time slot interchanger 135, transmit time slot interchanger 136, and time multiplex switch 137 of switching network 119. Receive time slot interchanger 135 comprises well-known buffer memory 200, time slot counter 201, time slot memory 202, and address multiplexer 203 interconnected as shown. The functions of these units are well known and more fully described in the aforementioned switching system references. Since the read and write cycles of receive time slot interchanger 135 coincide, only one additional buffer memory 205 and memory control selector 206 were connected as shown in interchanger 135. In addition, the read enable (RE) and write enable (WE) control signal leads where connected to memory control selector 206 instead of buffer memory 200. This two buffer memory arrangement utilizes a flip-flop or alternating read-write cycle in which all the data in a given time frame received from a group of TDM channels is written into only one buffer memory during a 125 microsecond period of time and then read out of the same buffer memory during the subsequent 125 microsecond time period. For example as depicted in FIG. 4, when data from a given time frame TF1 is being written into a first buffer memory 200 during a 125 microsecond time period T1, the data from the previous time frame TF0 is read out of a second buffer memory 205. During the next 125 microsecond period T2, the read/write process is reversed. For example, during 125 usec time period T2, the data from time frame TF2 is written into second buffer memory 205, and the data from time frame TF1 is read out of first buffer memory 200. Accordingly, the data in a given time frame from a first group of TDM channels is buffered for a full time frame period to ensure that all of the data received in the given time frame is assembled only in the same time frame when the data in the various time slots is interchanged. Well-known memory control selector 206 under the control of time slot counter 201 and read and write enable control signals from the TSI controller alternates the read/write operation between buffer memories 200 and 205.

Transmit time slot interchanger 136 as depicted in FIG. 2 comprises buffer memory 207, write time slot counter 208, read time slot counter 209, time slot memory 210, and address multiplexer 211 interconnected as shown. Write time slot counter 208 and read time slot counter 209 are included in transmit time slot interchanger to provide a predetermined time slot delay between the read and write cycles of the buffer memories to compensate for time delays caused by the switching network components. Accordingly, the read and write cycles of a time frame do not coincide as in receive time slot interchanger 135. To once again ensure time slot data of a given time frame remains in that time frame, buffer memories 212 and 213 under the control of memory control selector 214 interconnected as shown have been added to transmit time slot interchanger 136. As a result, the time slot data of three consecutive time frames is consecutively written into buffer memories 207, 212 and 213, respectively. Similarly, interchanged time slot data is read out of buffer memories 207, 212, and 213 during three consecutive time frame periods such that the time slot data in any given time frame is not read out of the same memory when data is being written into the memory.

Figure 5:
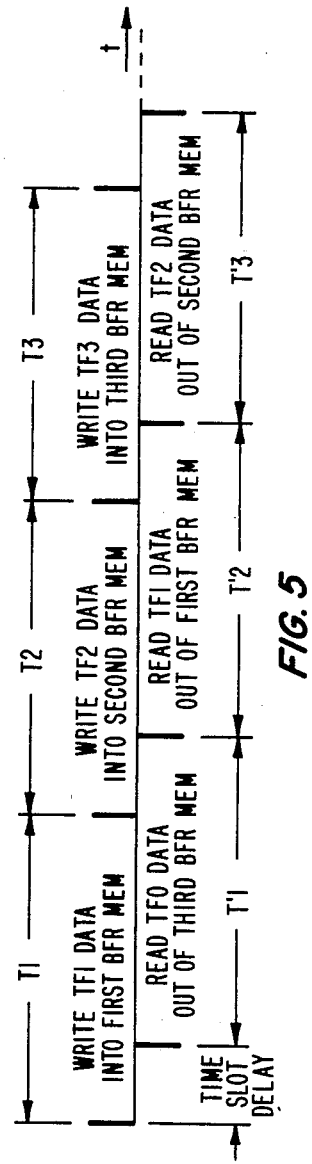
Figure 6:
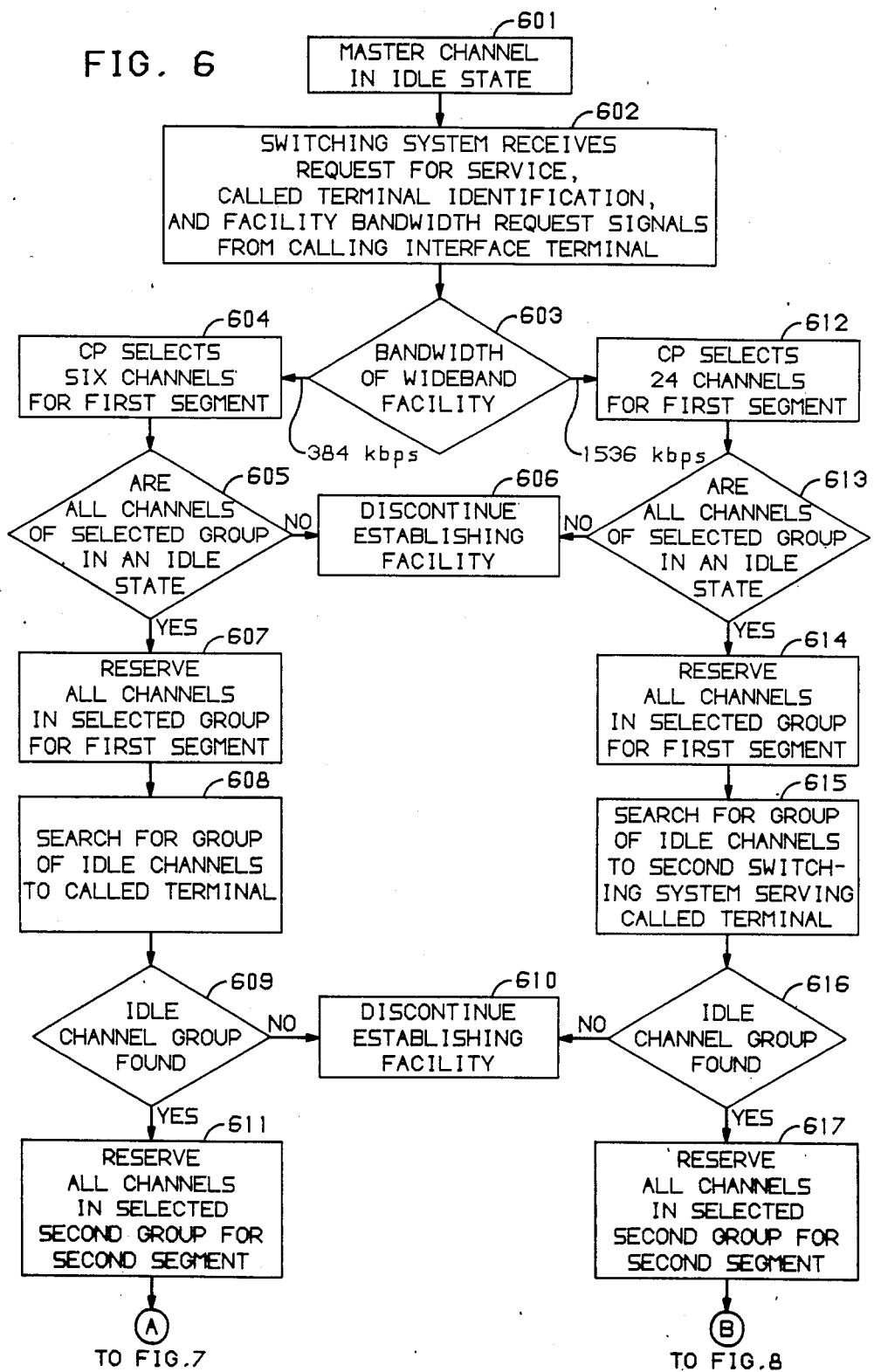

FIG. 5 is a timing diagram depicting the read/write cycle of transmit time slot interchanger buffer memories 207, 212, and 213. As shown, time frame data TF1, TF2, and TF3 is consecutively written into first, second, and third buffer memories 207, 212, and 213 during three consecutive 125 usec time periods T1, T2, and T3, respectively. As previously indicated, a multiple time slot delay between the initial read and write cycles of 125 usec time periods T1-T'1, T2-T'2, and T3-T'3 is inserted by write and read time slot counters 208 and 209 such that 125 microsecond time period T'1, for example, starts 17 time slots after time period T1. However, once initiated, the time slot data in third, first, and second buffer memories 213, 207, and 212 is consecutively read out during time periods T'1, T'2, and T'3 such that the time slot data of a given time frame is never read out of a buffer memory when data of another time frame is being written into the same buffer memory.

Depicted in FIGS. 6–11 is a flow chart illustrating an illustrative method for establishing a wideband communication facility between a calling and a called customer terminal via at least one switching system. For purposes of illustration, let it be assumed that a customer served by customer interface terminal 103 desires to establish a wideband communication facility to called customer interface terminal 104 via switching system 101. In this illustrative embodiment, the TDM channels of digital lines 150–157 are segregated into groups of six TDM channels with the first channel in each group being designated as a master channel. All the TDM channels have at least a busy and an idle state. The state of each channel is indicated, for example, in memory of each customer interface terminal and switching system serving the channel. In the idle state, the TDM channel is available for use. In the busy state, the TDM channel has been selected for use or is being used. Specifically, it is desired that a wideband communication facility be established between computer 106 and 110 via customer interface terminals 103 and 104 and switching system 101. A request for service message signal is sent from a calling customer interface terminal for a master channel associated with a particular group of TDM channels. Calling customer interface terminal 103 sends the request for service message signal on the out-of-band signaling D channel of digital line 150 for a master channel in an idle state (block 601 of FIG. 6). The request for service message signal typically includes a called terminal identification signal and a facility bandwidth request signal indicating the customer selected bandwidth for the wideband communication facility. Central processor 120 receives the request for service signal from calling customer interface terminal 103 via customer out-of-band signaling interface unit 125 (block 602). In this example, a calling customer can select either a 384 or a 1536 Kbps bandwidth. When a 384 Kbps rate bandwidth is customer selected (block 603), central processor 120 selects six 64 Kbps TDM channels to form a first group of TDM channels for the first segment of the wideband facility between calling interface terminal 103 and switching system 101 (block 604). Stored program-controlled central processor 120 examines the indicated state of each TDM channel in the selected group to determine whether each channel is in an idle state (block 605). When any channel in the selected group is not in an idle state, the central processor sends an out-of-band message to the customer interface terminal 103 denying the service request and discontinues establishing the wideband facility (block 606). When all of the channels in the selected group are in an idle state, the central processor reserves the selected group for the first facility segment by advancing the indicated state of all the channels in the selected group to a busy state (block 607).

Having reserved the first group of channels for the first facility segment, central processor searches for a group of idle channels to the called terminal as indicated by the called terminal identification signal sent by the calling interface terminal (block 608). The bandwidth of the idle channel group to the called terminal must be at least equal to the customer selected bandwidth as indicated by the facility bandwidth request signal. When an idle channel group cannot be found, the central processor denies the service request from the calling customer terminal and discontinues establishing the wideband facility (blocks 609 and 610). When an idle group of channels has been found, central processor 120 reserves the selected group of idle channels for the second segment of the called terminal by advancing the indicated state of the channels in this second group to a busy state (block 611).

Figure 7:
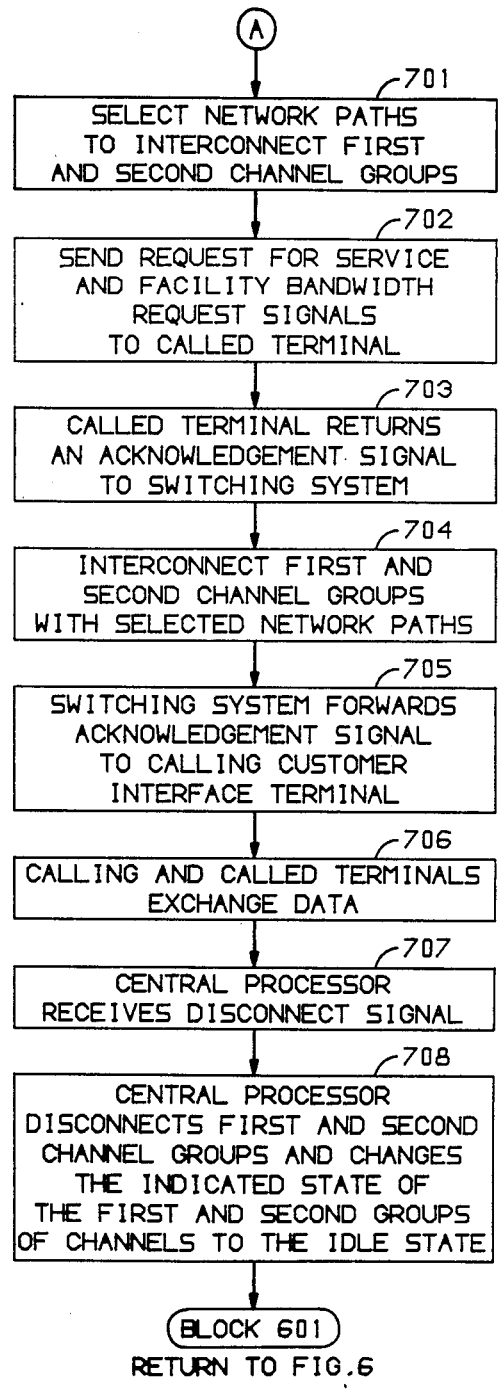

After all the channels in the second group have been reserved for the second facility segment, the central processor selects six network paths through switching network 119 to interconnect the first and second channel groups (block 701 of FIG. 7). The central processor via customer out-of-band signaling interface unit 125 sends the request for service and facility bandwidth request signals to called customer interface terminal 104 (block 702). In response, the called customer interface terminal returns an acknowledgment message signal to central processor 120 of switching system 101 via the out-of-band D signaling channel (block 703). As a consequence, switching network 119 interconnects the first and second channel groups via the selected network paths (block 704). Switching system 101 then forwards the acknowledgment signal to the calling terminal 103 via the out-of-band D signaling channel (block 705).

When the wideband communication facility is established, the calling and called terminals exchange data on the facility via switching network 119 (block 706). As previously described, switching network 119 assembles all the time slot data received in a given time frame from the first channel group only into the same time frame for transmission to the second channel group. This ensures that the data communicated between calling and called terminals 103 and 104 is received in the same order as it was sent.

Upon receiving a disconnect signal from either of the calling and called terminals (block 707), central processor 120 disconnects the first and second channel groups at the switching network and changes the indicated state of the first and second facility group channels to the idle state (block 708). When the indicated state of all the channels in the first and second groups is changed to the idle state, the channels are available for subsequent use by the customer terminal equipment served by customer interface terminals 103 and 104.

As previously suggested, a wideband communication facility may interconnect two customer interface terminals through two or more switching systems. To illustrate this example, let it be assumed that computers 106 and 114 desire to be interconnected with a wideband communication facility via first and second switching systems 101 and 102. As previously illustrated in FIG. 6, calling customer interface terminal 103 sends a request for service message signal on the out-of-band D signaling channel to switching system 101 for a master channel in an idle state (block 601). Switching system 101 receives the request for service message signal along with the called terminal identification and the facility bandwidth request signals (block 602). This customer signaling information is received via the customer out-of-band signaling D channel and customer out-of-band signaling interface unit 125. Upon receipt of the service request, central processor 120 analyzes the service request and determines the customer-selected bandwidth for the wideband facility (block 603). When a 1536 Kbps bandwidth is customer-selected, the central processor selects a first group of 24 channels in a digital line for the first segment of the wideband facility (block 612). The central processor then determines whether the indicated state of all of the first group channels are in the idle state (block 613). When the indicated state of any of the first group channels is not in the idle state, the central processor denies the service request and discontinues establishing the facility (block 606). On the other hand, when all of the channels in the first group are in the idle state, the central processor reserves all the second group channels by advancing the indicated state of all the channels in the selected group to the busy state (block 614).

After all the first group channels have been reserved, central processor 120 searches for a second group of 24 idle channels to second switching system 102 that serves customer interface terminal 105 (block 615). The second channel group is selected in response to the called terminal identification signal sent by the calling customer interface terminal 103. When an idle channel group to switching system 102 cannot be found, the central processor denies the service request and discontinues establishing the facility (block 610). However, when all of the channels in the selected group are indicated in the idle state (block 616), the central processor reserves the second group channels by advancing their indicated state to busy (block 617).

Central processor 120 then selects 24 network paths through switching network 119 to interconnect the first and second channel groups (block 801 of FIG. 8). The request for service, bandwidth, and called terminal identification signals are sent to second switching system 102 via the common channel signaling system (block 802). As shown in FIG. 2, out-of-band signaling information is transferred between switching systems 101 and 102 via signal transfer point (STP) 118 and data links 158 and 159. In response, switching system 102 reserves all the second group channels from switching system 101 by advancing their indicated state to the busy state (block 803).

Following a process similar to that performed by switching system 101, central processor 128 of switching system 102 searches for a group of idle channels to the called customer interface terminal in response to the receipt of the called terminal identification and facility bandwidth request signals (block 804). When an idle group of channels to the called customer interface terminal can not be found (block 805), central processor 128 denies the service request and discontinues establishing the facility (block 806). When a third group of idle channels between switching system 102 and called terminal can be found, central processor 128 reserves all the third group channels by advancing their indicated state to the busy state (block 807). Central processor 128 then selects 24 network paths through switching network 127 to interconnect the second and third channel groups (block 808). The service request and bandwidth request signals are then sent to the called customer interface terminal 105 (block 809).

Upon receipt of the service request and bandwidth request signals from switching system 102, called customer interface terminal 105 returns an acknowledgment signal to second switching system 102 (block 901 of FIG. 9). Switching network 127 interconnects the first and second channel groups with the selected network paths in response to the acknowledgment signal received from the called customer interface terminal (block 902). In addition, the acknowledgment signal is forwarded to first switching system 101 (block 903).

Upon receipt of the acknowledgment signal from switching system 102, switching network 119 interconnects the first and second channel groups with the selected network paths (block 904). Switching system 101 then forwards the acknowledgment signal to calling customer interface signal terminal 103 (block 905), and calling and called terminals exchange data over the wideband communication facility consisting of the interconnected first, second and third channel groups (block 906).

Upon completion of the data exchange between computers 106 and 114, calling customer interface terminal 103 sends a disconnect signal to first switching system 101 (block 907). In response, switching system 101 forwards the disconnect signal to second switching system 102 (block 908). Switching system 101 also disconnects the first and second channel groups (block 1001 of FIG. 10), changes the indicated state of the first group of channels to the idle state (block 1002), and returns a disconnect acknowledgment signal to calling customer interface terminal 103 (block 1003).

Similarly, in response to the receipt of the forwarded disconnect signal second switching system 102 disconnects the second and third channel groups (block 1004), changes the indicated state of the second group of channels to the idle state (block 1005), returns a disconnect acknowledgment signal to first switching system 101 (block 1006) and forwards the disconnect signal to the called customer interface terminal (block 1007).

In response to the receipt of the disconnect acknowledgment signal, first switching system 101 changes the indicated state of the second group of channels to the idle state (block 1101 of FIG. 11).

In response to the receipt of the disconnect signal, called customer interface terminal 105 sends a disconnect acknowledgment signal to second switching system 102 (block 1102), and switching system 102 responds by changing the indicated state of the third group of channels to the idle state (block 1103).

It is to be understood that the above-described apparatus for and method of establishing a wideband communication facility between a called and a calling customer terminal is merely an illustrative embodiment of the principles of this invention and that other apparatus and methods may be devised by those skilled in the art without departing from the spirit and scope of this invention. In particular, this method and apparatus may be utilized to establish a wideband communication facility across an entire telecommunications network by interconnecting any number of wideband facility segments with a plurality of network switching systems. In addition, each interconnecting switching system must be adapted to assemble all the data received in a given time frame from an incoming segment into the same time frame for transmission on the outgoing facility segment. Furthermore, the bandwidth of facility is selectable in response to a facility bandwidth request signal indicating the customer-selected bandwidth.

What is claimed is:

1. For use in a communications network having a switching system and a plurality of time division multiplex (TDM) channels each having a relatively narrow bandwidth, a method for establishing a wideband communication facility between a calling customer terminal and a called customer terminal via said switching system, said facility having a predetermined bandwidth wider than any one of said TDM channels, comprising the steps of:

establishing a first segment of said facility between said calling terminal and said switching system, said first segment comprising a first group of said TDM channels having a total bandwidth at least equal to said predetermined bandwidth;

establishing in cooperation with the establishment of said first segment a second segment of said facility between said switching system and said called terminal in response to the receipt of a called terminal identification signal, said second segment comprising a second group of said TDM channels having a total bandwidth at least equal to said predetermined bandwidth; and assembling all the data received in a given time frame from said first channel group established in said first segment only into the same time frame for transmission on said second channel group established in said second segment.

2. The invention of claim 1 wherein said switching system includes a switching network for establishing a plurality of paths to selectively interconnect said channels and wherein said assembling includes selecting predetermined of said paths having a total bandwidth at least equal to said predetermined bandwidth to interconnect said first and second channel groups and interconnecting said first and second channel groups via said predetermined paths when said first and second segments are established.

3. The invention of claim 1 wherein establishing said first facility segment includes selecting predetermined of said channels between said calling terminal and said switching system for said first channel group in response to the receipt of a facility bandwidth request signal indicating said predetermined bandwidth.

4. The invention of claim 1 wherein each of said channels has an idle and a busy state wherein establishing said first facility segment includes determining the state of each of the channels in said first channel group and reserving all of the channels in said first channel group for said first segment when all of the channels in said first channel group are in said idle state.

5. The invention of claim 4 wherein establishing said first facility segment further includes discontinuing establishing said facility when any of the channels in said first channel group are in said busy state.

6. The invention of claim 1 wherein each of said channels has an idle and a busy state and wherein establishing said second facility segment includes searching for a predetermined number of said channels between said switching system and said called terminal in said idle state for said second channel group in response to said called terminal identification signal indicating said called terminal.

7. The invention of claim 6 wherein establishing said second facility segment includes reserving all of the channels in said second channel group for said second facility segment when said predetermined number of said channels between said switching system and said called terminal in said idle state have been found and discontinuing establishing said facility when said predetermined number of said channels between said switching system and said called terminal in said idle state have not been found.

8. The invention of claim 1 further comprising disconnecting said communication facility between said calling and called terminals in response to the receipt of a disconnect signal.

9. For use in a communications network having a first and a second switching system and a plurality of time division multiplex (TDM) channels each having a relatively narrow bandwidth, a method for establishing a wideband communication facility between a calling customer terminal and a called customer terminal via said switching systems, said facility having a predetermined bandwidth wider than any one of said TDM channels, comprising the steps of:
establishing a first segment of said facility between said calling terminal and said first switching system, said first segment comprising a first group of said channels having a total bandwidth at least equal to said predetermined bandwidth;
establishing in cooperation with the establishment of said first segment a second segment of said facility between said first and second switching systems in response to the receipt of a called terminal identification signal, said second facility segment comprising a second group of said channels having a total bandwidth at least equal to said predetermined bandwidth;
establishing in cooperation with the establishment of said second segment a third segment of said facility between said second switching system and said called terminal in response to the receipt of said called terminal identification signal, said third facility segment comprising a third group of said channels having a total bandwidth at least equal to said predetermined bandwidth;
assembling all the data received in a given time frame from said first channel group established in said first segment only into the same time frame for transmission on said second channel group established in said second segment; and
assembling all the data received in said given time frame from said second channel group established in said second segment only into the same time frame for transmission on said third channel group established in said third segment.

10. The invention of claim 9 wherein said first switching systems includes a first switching network and said second switching system includes a second switching network, wherein assembling the data from said second channel group includes selecting predetermined of said second switching network paths to interconnect said second and third channel groups via said predetermined second network paths when said second and third segments are established; and wherein assembling the data from said first channel group includes selecting predetermined of said first switching system network paths to interconnect said first and second channel groups via said predetermined first network paths when said first and second segments are established.

11. The invention of claim 9 wherein establishing said first facility segment includes selecting predetermined of said channels between said calling terminal and said first switching system for said first channel group in response to the receipt of a facility bandwidth request signal indicating said predetermined bandwidth.

12. The invention of claim 11 wherein each of said channels has an idle and a busy state and wherein establishing said first facility segment further includes determining the state of each of the channels in said first channel group, reserving all of the channels in said first channel group for said first facility segment when all the channels in said first channel group are in said idle state, and discontinuing establishing said facility when any of the channels in said first channel group are in said busy state.

13. The invention of claim 12 wherein establishing said second facility segment includes searching for a predetermined number of said channels in said idle state between said first and second switching systems for said second channel group in response to said facility bandwidth request signal and said called terminal identification signal, reserving all of the channels in said second channel group for said second facility segment when said predetermined number of said channels in said idle state between said first and second switching systems have been found, and discontinuing establishing said facility when said predetermined number of said channels in said idle state between said switching systems have not been found.

14. The invention of claim 13 wherein establishing said third facility segment includes searching for a predetermined number of said channels in said idle state between said second switching system and said called terminal for said third channel group in response to said facility bandwidth request signal and said called terminal identification signal, reserving all of the channels in said third channel group for said third facility segment when said predetermined number of said channels in said idle state between said second switching system and said called terminal have been found, and discontinuing establishing said facility when said predetermined number of said channels in said idle state between said second switching system and said called terminal have not been found.

15. The invention of claim 9 further comprising disconnecting said communication facility between said calling and called terminal in response to the receipt of a disconnect signal.

16. For use in a communications network having a switching system and a plurality of time division multiplex (TDM) channels each having a relatively narrow bandwidth, apparatus for establishing a wideband communication facility between a calling and called terminal, said facility having a predetermined bandwidth wider than any of said TDM channels, said apparatus comprising:
means for establishing a first segment of said facility between said calling terminal and said switching system and a second segment of said first facility between said switching system and said called terminal, said first facility segment comprising a first group of said TDM channels having a total bandwidth at least equal to said predetermined bandwidth, said second facility segment comprising a second group of said TDM channels having a total bandwidth at least equal to said predetermined bandwidth; and said switching system including means having a bandwidth at least equal to said predetermined bandwidth for interconnecting said first and second channel groups, said interconnecting means including means for assembling all the data received in a first time frame from said first channel group established in said first segment only into the same time frame for transmission on said second channel group established in said second segment.

17. The invention of claim 16 wherein said first time frame includes a plurality of time slots for communicating said data and wherein said interconnecting means includes first time slot means for interchanging said time slot data received in said first time frame from said first channel group, second time slot means for interchanging said time slot data received in said first time frame from said first time slot means only into the same time frame for transmission on said second channel, and time multiplex means for selectively interconnecting said first and second time slot means.

18. The invention of claim 17 wherein said first slot means comprises first memory means for storing said time slot data received in said first time frame; second memory means for storing time slot data received in a second time frame, and control means for selectively writing and reading the time slot data of said first and second time frames into and out of said first and second memory means during successive periods of time.

19. The invention of claim 17 wherein said second time slot means includes first memory means for storing said time slot data received in said first time frame; second memory means for storing time slot data received in a second time frame; third memory means for storing time slot data received in a third time frame; and control means responsive to a first control signal for selectively writing the time slot data received in said first, second, and third time frames into said first, second, and third memory means, respectively, and responsive to a second control signal for selectively reading the time slot data received in said first, second, and third time frames out of said first, second, and third memory means, respectively.

20. The invention of claim 17 wherein said first time slot means comprises first memory means for storing said time slot data received in said first time frame; second memory means for storing time slot data received in a second time frame; and control means responsive to a first control signal for selectively writing the time slot data received in said first and second time frames into said first and second memory means, respectively, and responsive to a second control signal for selectively reading the time slot data received in said first and second time frames out of said first and second memory means, respectively.

* * * * *